[redacted]

United States [11] 3,581,013

[72] Inventor Jean Jacqu...
Garches, France
[21] Appl. No. 785,105
[22] Filed Dec. 19, 1968
[45] Patented May 25, 1971
[73] Assignee International Standard Electric Corporation
New York, N.Y.
[32] Priority Dec. 21, 1967
[33] France
[31] 133,321

[54] MOBILE RADIOTELEPHONE COMMUNICATION SYSTEM

10 Claims, 3 Drawing Figs.

[52] U.S. Cl. .......... 179/41, 340/311, 325/55, 325/64
[51] Int. Cl. .......... H04g 7/04
[50] Field of Search .......... 325/53, 54, 55, 4, 6, 57, 58; 343/177; 179/18.04, 41 (A); 340/311, 312

[56] References Cited

UNITED STATES PATENTS

| | | | |
|---|---|---|---|
| 2,680,154 | 6/1954 | Dorff | 325/53 |
| [illegible] | [illegible] | Berglund | 179/41 |
| 3,110,773 | 11/1963 | Miller | 179/41 |
| 3,114,142 | 12/1963 | Bode et al. | 340/311 |
| 3,394,223 | 7/1968 | DeWitt | 179/15 |

*Primary Examiner*—Kathleen H. Claffy
*Assistant Examiner*—Jan S. Black
*Attorneys*—C. Cornell Remsen, Jr., Walter J. Baum, Percy P. Lantzy, J. Warren Whitesel, Delbert P. Warner and James B. Raden

ABSTRACT: A mobile telephone system is provided with radio telephone and paging equipment which is serviced over a group of channels allotted to a fixed radio telephone station. The latter provides automatic communication between the customers of a public telephone ground network and mobile sets. A free channel is marked by a tone, to be taken in a telephone call. Paging call numbers directed to paging mobile sets are transmitted from the station if the required channel is free. If the channel is not free, these paging calls alternate with the radiotelephone communications. In order to more effectively use the equipment, the called paging numbers are stored and then transmitted in limited trains of numbers.

3581013

MOBILE RADIOTELEPHONE COMMUNICATION SYSTEM

The present invention relates to mobile radiotelephone communication systems, in which the fixed radiotelephone stations are associated with telephone exchanges to enable users of public telephone systems to communicate with the users of mobile units (mounted in vehicles, etc. The radiotelephone link itself implies two-way communication with the mobile receiver and transmitter radiotelephone units. The latter are hereinafter referred to as "mobile units" and the radiotelephone communication links with these mobile units are referred to as the "RT service."

Another kind of communication is also employed, in which selecto-calls only are transmitted to mobile equipments, which are simple receivers capable of decoding their selecto-call numbers and of producing a local paging signal to indicate to the user that he is being called. These equipments are hereinafter referred to as "paging units" and the links with these units (a telegraphic-type one-way link) is referred to as the "P service." Since there is no reply or communication following the transmission of a selecto-call from the P service, all that needs to be done with a terminating call to this service received by the telephone exchange is to transmit it over a channel of the associated radiotelephone station. No connection needs to be established between the switching circuits of the exchange and those of the station, between the calling line and the channel used.

In (French) patent application No. PV 110 768 made in the same name on June 16, 1967, for a "Mobile Radiocommunication System," a system was described, in which the radiotelephone station uses a service channel in addition to the speech communication channels. This service channel is used for transmitting the selecto-calls of both the RT and P services. The mobile units on standby automatically select this channel whilst waiting for a selecto-call and the paging units are constructed to be tuned to the radiofrequency of this channel.

The present invention enables a P service to be combined with an RT service, using the speech channels of the latter. This consists of transmitting P service selecto-calls over channels which can be busied for relatively long periods.

The invention is applicable to installations in which the telephone exchange is equipped with registers that receive terminating calls and recognize these for the P service, and in which the associated radiotelephone station, which operates on one or more speech channels, is equipped with a device for seizing these channels.

According to one of the features of the present invention, at least one speech channel is used for P service calls; a memory device is provided to store the numbers requested by the P service, whilst waiting for the channel reserved for these numbers to become free; the aforementioned registers are connected to this device in order to transfer to it the numbers requested by the P service; and the availability of such a channel is controlled by a priority alternating device, such that after an RT service call, this channel is first offered to the P service before being freed, and after a P service transmission, is first offered to the RT service before being freed. Preferably, the terminating call connection will be released by the register as soon as the latter has recognized that the call number belongs to the P service.

It should be understood that the ordinary switching means, such as couplers, connecting bundles, etc., can be employed between the registers and the memory device, but that a register, which has recognized a P service number, does not require the telephone switching circuits to extend the terminating call connection to a channel as they would do for RT service numbers.

According to another feature of the present invention, P service numbers are transmitted in limited groups, meaning that when a channel is seized by the P service, a limited group only of the numbers stored in memory are extracted from the memory device, after which the channel is again offered to the RT service. The fact that a group of numbers is transmitted rather than a single number before the channel is again offered to the RT service ensures that the P service traffic is satisfactorily dispatched (when there is no other free channel). In addition, when the P service is shared amongst several channels, although the memory device can handle only one channel at a time, limiting the length of a P service transmission over any one channel ensures that P service traffic is also dispatched over the other channels.

According to another feature of the present invention, means are provided to limit the length of RT service communications over a channel which is also used for the P service, especially when P service numbers for this channel are in store in the memory device. RT service communications could, for example, be interrupted after three minutes.

In telephone switching installations, it is common practice to refuse a terminating call when there are no free connections to the requested number. Contrary to this practice, and in accordance with another feature of the present invention, means are provided in the switching device to enable an RT service terminating call to wait (instead of being refused) when there is no free speech channel, but a channel is busied by the P service for transmitting a limited group of numbers, in order to accept the RT service call after transmission of this limited group.

According to another feature of the present invention, the P service group comprises several sections of paging units, severally catered for by several speech channels; and the memory device has discriminating means for dispatching the required numbers to their respective channels. For example, any section of paging units may be designated by the first figure of the corresponding call numbers, which would no longer need to be transmitted for a selecto-call over the channel allotted to its section. Such discriminating means may, for example, consist of recording the numbers in separate sections of the memory device, each assigned to a given section of paging units; or busy using a memory device with means for indexed search, etc.

Another feature of the present invention applies to the case where the P service is spread over several channels, whilst the memory device can use only one channel at a time. According to this feature, the memory device is associated with a free-running selection device, which continuously explores the memory device with regard to all channels. The free-running selection device can, for example, be controlled by a cyclic distribution device or in chronological order or by the quantities of numbers stored at the addresses of the different channels, etc. All these types of free-running selection are well known in telephone switching.

It will be understood that the present invention applies more especially to communication systems not possessing a service channel. However, it also applied to systems which do have a service channel, such as that described in the patent application mentioned above. On the other hand, the present invention applies to RT networks with single-tone markers as well as two-tone.

It will be remembered that in single-tone systems, a free speech channel is tagged with a "G" tone. If there is no service channel, all mobile units on standby switch to this "G" channel, which may be subsequently seized either by the station for a terminating call or by a mobile unit for an originating call. As soon as this channel is seized, its "G" tone is interrupted to avoid double seizure and then transferred to another free channel. For information, another system may be mentioned in which terminating selecto-calls are transmitted over all free channels, such that mobile units on standby may remain tuned to any free channel and can receive a terminating selecto-call or transmit an originating call; this is the case of a manually operated system. In two-tone marker systems, one free channel is tagged with an "A" tone and another with a "D" tone. The mobile units all switch to the "A" channel and the station uses this channel for a terminating call. When the handset of a mobile unit is lifted to make an originating call, the unit first switches from the "A" channel to the "D" channel in order to transmit its call to the station. In both types of system, the "G," "A" and "D" markers are switched to the free channels by means of cyclic distribution devices in order to share the RT traffic equally over all channels.

In the application of the present invention to these systems, "offering" a channel to the RT service consists in signalling to these cyclic distribution devices that the channel is free for marking if it is its turn (and especially if no other channel is free). In the case where any free channel could be seized by RT calls, "offering" a channel for RT service would consist in marking it "free."

The present invention provides for another variant, which applies to communication systems covering extended areas (or distances) by means of several sorts of stations which operate on different groups of channels and are located such that two adjacent stations are not the same sort in order to avoid interference between channels. A system of this type was described in the patent of addition application No. PV 128,688, dated Nov. 17, 1967, to the French patent application dated June 16, 1967, for "A Mobile Radiocommunication System," both being in the same name as the present application. Referring to this patent of addition application, where an areas is covered by three sorts of stations, the present invention, in its aforementioned variant form, provides for P receivers capable of being tuned to one channel in the three different groups, i.e. to one channel operated by each sort of station; or tuned to all three of these channels at the same time. In this variant, the P receiver units are preferably shared amongst several channels.

This variant of the present invention particularly applies to communication systems covering extended areas (or distances) in which a single common service channel is provided for all sorts of stations for the purpose of transmitting terminating RT service calls. Interference between adjacent stations on this channel is negligible infrequent in practice, since the channel is very little busied and its simultaneous bussing by the adjacent stations would be very rare. The use of the service channel for terminating P service calls, as in the systems described in the patent and patent of addition applications mentioned above, loads the service channel and would require the use of another service channel for each of the different groups of channels in order to avoid interference between them. In the system according to the present invention, where the P service is effected over the speech channels, the P service does not load the service channel, when there is in fact one. Thus the present invention provides a communication system covering an extended area (or distance), comprising different groups of channels for communication and originating RT calls and for terminating P calls, and a single service channel, the same for all groups, for terminating RT calls. In this system, the mobile units on a standby remain tuned to the same channel wherever they are. The paging receiver units remain tuned each to a channel in each group; they are preferably shared amongst several channels in each group, but this distribution is fixed for the P service for several groups of subscribers to this service.

The present invention is described below with particular reference to the attached drawings in which.

Figure 1:
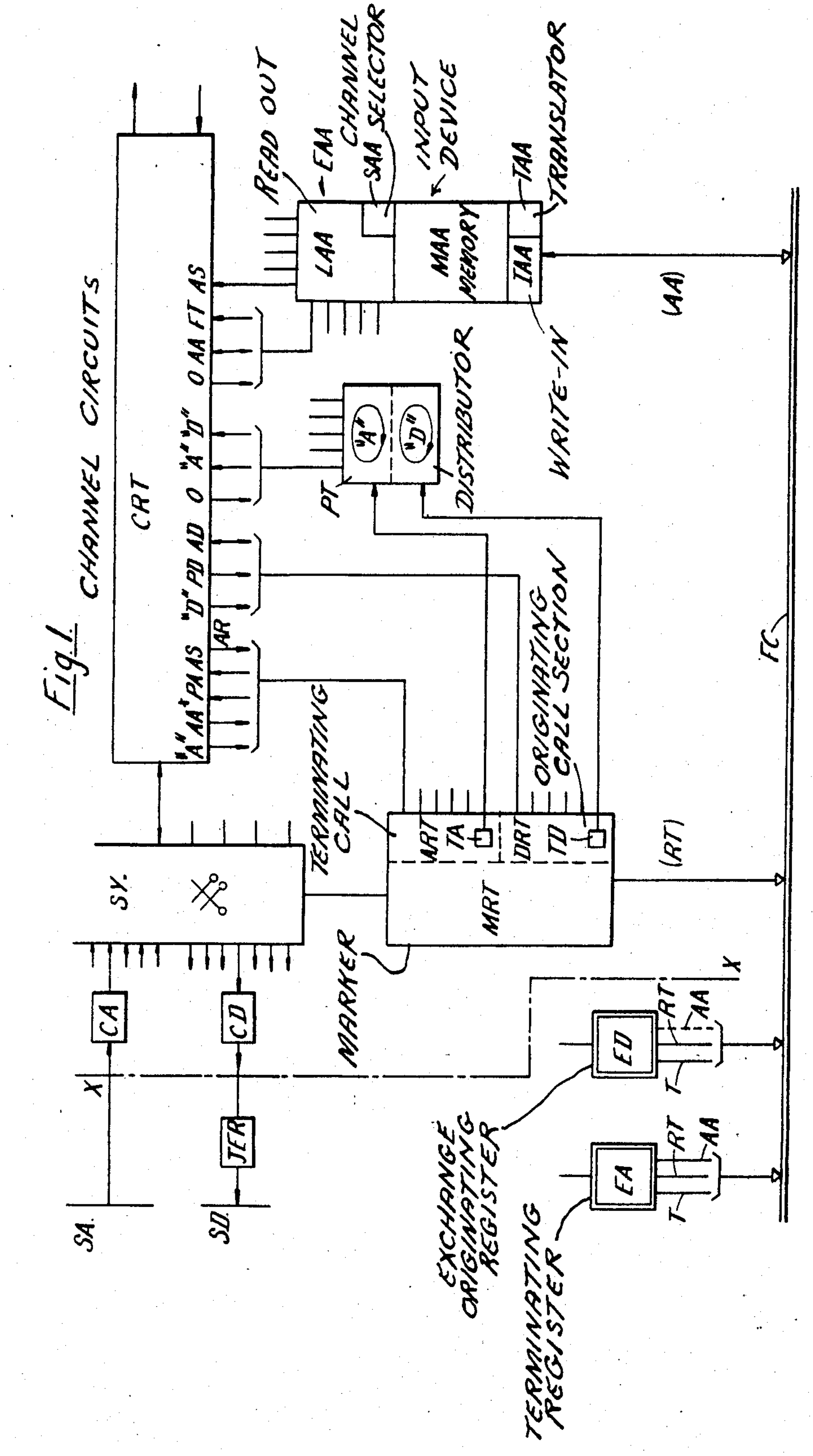
FIG. 1 is a functional block diagram, which shows the components of a switching network in a fixed radiotelephone station and in the associated telephone exchange, equipped in accordance with the present invention.

In the system described hereinafter, it is assumed that the following conditions apply, notwithstanding that the present invention is not limited by them:

1. the tones transmitted by the station and received by the mobile units are different from those transmitted by the mobile units and received by the station, such that a mobile unit cannot receive a signal transmitted by another mobile unit;
2. the receivers are able to distinguish between a long continuous tone and the same tone chopped or keyed by another tone;
3. the terminating selecto-calls key the "G" or "A" marker tone of a channel with another tone, as in two-current telegraphy, and this keying suppresses the continuous tone.

It is further assumed that the invention is applied to a station and exchange where the switching system is as described in the patent application mentioned above. Various items shown in FIG. 1 of the aforementioned patent application will therefore be recognized in FIG. 1 of the attached drawings. The exchange is to the left of line X–X and the station to the right. In the station, the switching system comprises an SY stage of the type described in (French) patent application No. PV 102,503, dated Apr. 12, 1967, under the same name, for "Improvements in Automatic Mobile Radiotelephone Networks." The SY stage comprises a group of inputs on the exchange side and two groups of outputs on the opposite side (the terms "inputs" and "outputs" employed here do not refer to the direction of the traffic). Each cross-point in this stage connects an input to two corresponding outputs, one in each group. One group of outputs has two-way junctions to the circuits CRT of the radiotelephone channels. The other group of outputs (not shown in the present FIG. 1) has signalling junctions to a terminal stage of the radiotelephone switching system. The outputs of this stage (which are not shown either) have the line circuits (including the meters) of mobile subscribers (see the two aforementioned patent applications). The SY stage inputs form one group assigned to terminating calls and another assigned to originating traffic. The terminating group inputs carry the terminating circuits CA, which are connected to the outputs of the group stage SA in the terminating chain of the exchange. The originating group inputs carry the originating circuits CD, which are connected (via register junctors JER) to the inputs of the SD group stage in the originating chain of the exchange.

The drawing shows the exchange terminating registers EA and the originating registers ED and a marker unit, MRT, in the station, which explores and controls the switching circuits, the line circuits and the channel circuits CRT. The recorders can communicate with this marker unit via a connecting bundle, FC. A distributor, PT, is associated with the CRT circuits for cyclic distribution of "A" and "D" markers to free channels in the two-channel system. The station described here does not possess a service channel for transmitting selecto-calls. Each RT service selecto-call is transmitted over a free channel marked "A," and the P service calls are transmitted over the channels assigned to this service when they are free. It should be understood, however, that the present invention is not limited to the device described herein.

The following is a brief description of operation of the radiotelephone communication service (RT service). CRT circuits can assume four states: (1) free and marked "A"; (2) free and marked "D"; (3) free but unmarked; and (4) busy. When the exchange receives a terminating call for a mobile unit, it sends the requested number to a marker unit MRT, which tests the line circuit assigned to this mobile unit and engages the channel marked "A" to transmit the selecto-call over this channel. The call is transmitted by keying the "A" tone with another tone. During the selecto-call, any mobile units (which were on standby, tuned to the channel marked "A") remain locked to this channel. The requested mobile unit, which decodes its own number, then remains on this channel for the ensuing conversation, whilst the other mobile units start searching for an "A" marker on another channel. When the station receives the acknowledgement from the called mobile unit, it transfers the marker to another free channel. When the handset of a mobile unit is lifted to make an originating call, the unit first switches from the "A" channel (to which it was tuned on standby) and selected the "D" channel. It transmits a seizure signal over this channel and the station responds by removing the "D" marker from the channel and applying it to another free channel. The originating call may then proceed on the engaged channel.

The following describes the equipment provided for the P service and the operation of this service over the same channels. In the example given, it is assumed that the groups of paging receiver units are distributed amongst all channels. In the case where all paging receivers are assigned to a single channel, the channel shown would be that used by both services; the other channels would not be concerned by the following description. The terminating calls for paging receivers are registered and recognized as such by the exchange terminating register EA (or, if these calls originate from ordinary or mobile subscribers attached to the same exchange, in the originating registers). In the station, an input device EAA is associated with the CRT channels. This device receives the numbers requested by the P service from the registers (directly via the connecting bundle FC) and stores them in memory whilst waiting to transmit them over their respective channels. This device comprises a memory unit MAA, a write-in device IAA, and a read-out device LAA. The write-in device comprises a translator TAA, which analyses the numbers received from the registers to determine their channels and the numbers to be transmitted for selecto-calls in the code of these calls. The present invention does not, however, exclude such a translator from being associated with the exchange registers, instead of being associated with input device EAA, in the station. The register, which has sent a paging number to the input device EAA, frees itself and releases the terminating connection. Write-in device IAA inscribes the number to be called and its channel number in memory unit MAA. The latter can have an associative memory.

Read-out device LAA is associated with a channel selector SAA. This selector can operate so as to take channels in cyclic order or in any other suitable manner (chronologically or according to the quantities of numbers, etc.). The read-out device is also linked with the CRT channels. In particular, it receives the "O" signal of occupied channels. Taking note of this indication, selector SAA designates a free channel. The read-out device explores memory MAA for numbers assigned to the designated channel. If there are any numbers stored at the address of this channel, the read-out device transmits a "P" signal to the CRT channel. The channel is busied by this signal and signals it is busy to distributor PT. If this channel is tagged with an "A" or "D" tone (which it signals to marker unit MRT for the RT service), it drops its tone, and the marker unit sends a signal to distributor PT via its TA device in the terminal call section ART, or via its TD circuit in the originating call section DRT, where the corresponding cyclic distribution circuits ("A" or "D") transfer the tone to another free channel.

The read-out device then extracts the numbers addressed to the engaged channel from memory MAA and, whilst counting them, transfers them to the CRT channel via its AS connection, and the CRT channel transmits the corresponding selecto-calls. When the count reaches a predetermined figure, or if the numbers addressed to the channel run out first, the read-out device sends an "end-of-group" SIGNAL, FT, to the CRT channel. The latter is partially freed : it interrupts the busy signal sent to distributor PT, but continues sending this same signal for a given time to the read-out device LAA. Thus this channel cannot be immediately reoccupied for P service, and it is then offered for RT service so that distributor PT can apply an "A" o "D" marker to it (if required) and it can be taken by marker unit MRT for a terminating RT service call or by a mobile unit for an originating call on this service, depending on the marker applied.

On the other hand, after an RT service communication, the CRT channel is partially freed the other way round: it interrupts the engaged signal sent to read-out device LAA, but continues to send it for a further given time to marker distributor PT. Thus this channel cannot be immediately reoccupied for RT service, its having no marker, and is therefore offered for P service.

FIG. 1 shows the main connections required by the three modes of operation described, namely, terminating RT calls, originating RT calls and terminating P calls. The terminating call section ART of marker MRT is connected to each of circuits CRT by a connection "A" which shows it whether the channel is marked "A"; by an connection PA for seizing the circuit by the marker unit; by connection AS for keying the selecto-call; and by a connection AR for the acknowledgement signal from the mobile unit. The originating call section DRT, of marker unit MRT is connected to each CRT circuit by a "D" connection, which indicates to sections DRT if the channel is marked "D"; by a PD connection, which indicates to section DRT if the channel has been taken for an originating call; and an AD connection for the remainder of the originating call signalling. Marker unit MRT is connected on the other hand to the marker distributor PT via a connection between device TA in the marker unit and the "A" chain in the distributor, and via a connection between device TD in the marker unit and the "D" chain in the distributor. These devices in the marker unit operate at predetermined times in the programme of terminating and originating calls to control the transfer of a marker to another channel. As for distributor PT, it is connected to each CRT circuit by an O connection, which indicates to the distributor if the circuit is busy, and by "A" and "D" connections for applying a marker to this circuit. Finally, read-out device LAA is connected to each CRT circuit by the connections already mentioned, O, AA, FT and AS.

Figure 2:
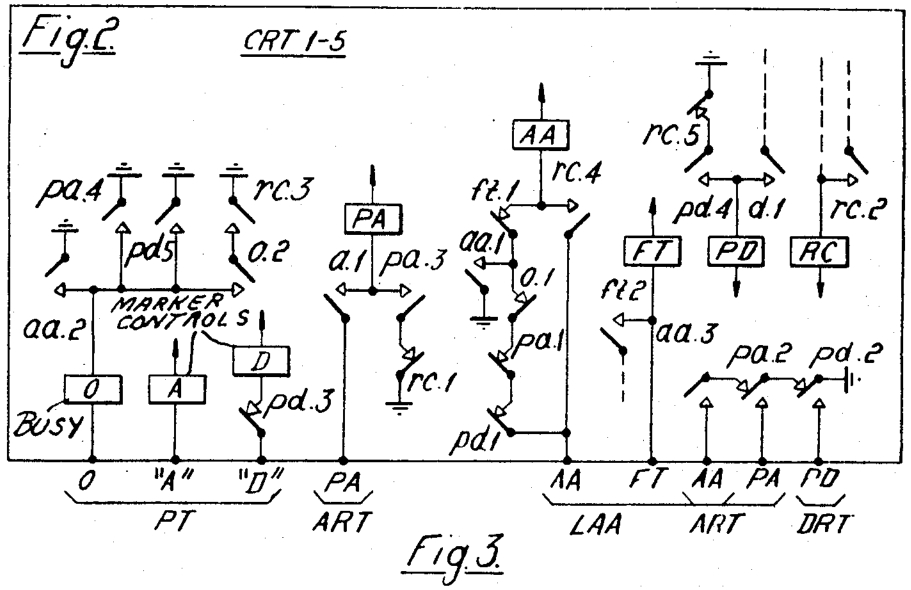
FIG. 2 shows seizure equipment in accordance with the present invention in a channel circuit in a two-tone marker system, with a P service over all channels.

FIG. 2 shows the equipment in a CRT circuit, which provides the three modes of operation described above. This equipment comprises a relay O, which indicates the busy condition, relays A and D, which control the "A" and "D" markers, the seizure relays PA and PD for terminating and originating RT service calls, a release relay RC for these calls and relays AA and FT for seizure for the P service and for the end-of-group signal.

In a free, unmarked circuit, all these relays are at rest, and the circuit can then be engaged by read-out device LAA (FIG. 1) for a selecto-call of the P service. The AA connection coming from this device reaches relay AA via the back contacts *pd*.1, *pa*.1, *o*.1 and *ft*.1. Relay AA holds in on its front contact *aa*.1 through contact *ft*.1. It operates the busying relay O by its front contact *aa*.2. Relay O operates in series on connection O going to distributor PT (FIG. 1), thus preventing this distributor from applying a marker ("A" or "D") to this CRT circuit. Relay AA signals its operation to the read-out device via back contacts *pd*.2 and *pa*.2, its front contact *na*.3 and connection AA'. The read-out device starts sending a group of numbers stored to the address of the channel under consideration via its AS connection (FIG. 1) and other means in the CRT circuit, not shown. When this group is finished, relay FT is operated by the signal from the read-out device via connection FT. Relay FT holds in by its front contact *ft*.2, onto a time-delay circuit not shown. Contact *ft*.1 deenergizes relay AA and prevents its being reenergized. Thus the channel is prevented from being taken again by the P service for the time of the delay applied to relay FT. However, contact *aa*.2 resets relay O, thereby enabling distributor PT to mark the channel, which offers this channel in priority to the RT service.

It is now assumed that the distributor applies an "A" marker to the circuit shown. Relay A is operated by the distributor via connection "A". This relay causes an "A" tone to be transmitted by means not shown. If there is no terminating call waiting in marker unit MTR (FIG. 1), the channel may be taken by the input device EAA (FIG. 1) for P service, as described above (operation of relay O will immediately release marker relay A by means provided in the marker distributor and described below). If there is a call waiting, section ART operates the engagement relay PA via its PA connection and the front contact *a*.1. Relay PA holds in via its front contact *pa*.3 and the back contact *rc*.1. It operates the busying relay O via its contact *pa*.4 and signals its operation to marker unit MRT (section ART), which starts transmitting the selecto-call. If the called unit replies (its reply being received in the CRT circuit by means not shown), the marker unit proceeds to extend the telephone connection and operate the ringing circuit, etc. in order to establish the telephone communication.

It will be seen that when marker unit MRT receives a terminating call from a register, it should first search for an "A" marker on a channel. Normally, if the marker unit fails to find this marker, it would refuse the call and initiate, for example, the sending of a busy tone to the caller. In the operation of the system in accordance with the present invention, the marker unit tests the CRT circuits not only for an "I" marker but also for a P service transmission. For this reason, connection AA' is also linked to the ART section. When the marker unit fails to find an "A" marker but finds a channel busied by the P service, it does not refuse the terminating call but waits for the end of the group of numbers transmitted for the P service. For this reason, a time-delay device is provided in the terminating section ART. When the group of P service numbers has passed, the channel is offered for marking as explained above. If it receives an "A" marker, the terminating call will be processed. If, however, the CRT circuit receives a "D" marker" (in the two-marker system considered here as an example), the marker unit will refuse the terminating call at the end of the time-delay mentioned above.

After the communication has finished, the release relay RC is operated by means not shown and holds in via its front contact *rc*.2; relay RC holds in relays O, thereby preventing the marker distributor PT from marking this circuit during the time relay RC holds in. The circuit is therefore prevented from being taken again at once by the RT service. However, contact *rc*.1 releases relay PA, and the front contact *rc*.4 enables the read-out device to operate relay AA for the P service whilst contact *o*.1 remains open. The channel is thus offered in priority to the P service. If it is not taken by this service, as described above, relay RC restores after the time-delay, releases relay O and enables the marker distributor to mark this channel if required.

It is now assumed that distributor PT applies an "D" marker to the circuit shown. Relay D is operated by the D connection coming from the distributor via the back contact *pd*.3. This relay controls the transmission of the "D" tone by means not shown. As long as an originating call has not been received, the channel can still be taken by the input device EAA (FIG. 1) for the P service, as described above (relay O immediately deenergizes the marker relay D via the marker distributor circuits described below). If a seizure signal is received from a mobile unit, relay PD is energized by means not shown via the front contact *d*.1. This relay then holds in via its front contact *pd*.4 from a back contact, *rc*.5, of the release relay RC. Its contact *pd*.3 immediately cuts off marker relay D. Its front contact *pd*.5 energizes the busying relay O and the operated state of the relay is signalled to the marker unit MRT (DRT section) by its contact *pd*.2 and connection PD. The marker unit proceeds to set the telephone connection up to an originating register, which will transmit its tone to the calling mobile unit so that the latter may send the usual data (its own call sign and then the number requested). The exchange then establishes the telephone connection with the called subscriber. When the communication is ended, the release relay is energized and operates as described above, first offering the channel to the P service before allowing the distributor to mark it for RT service.

Figure 3:
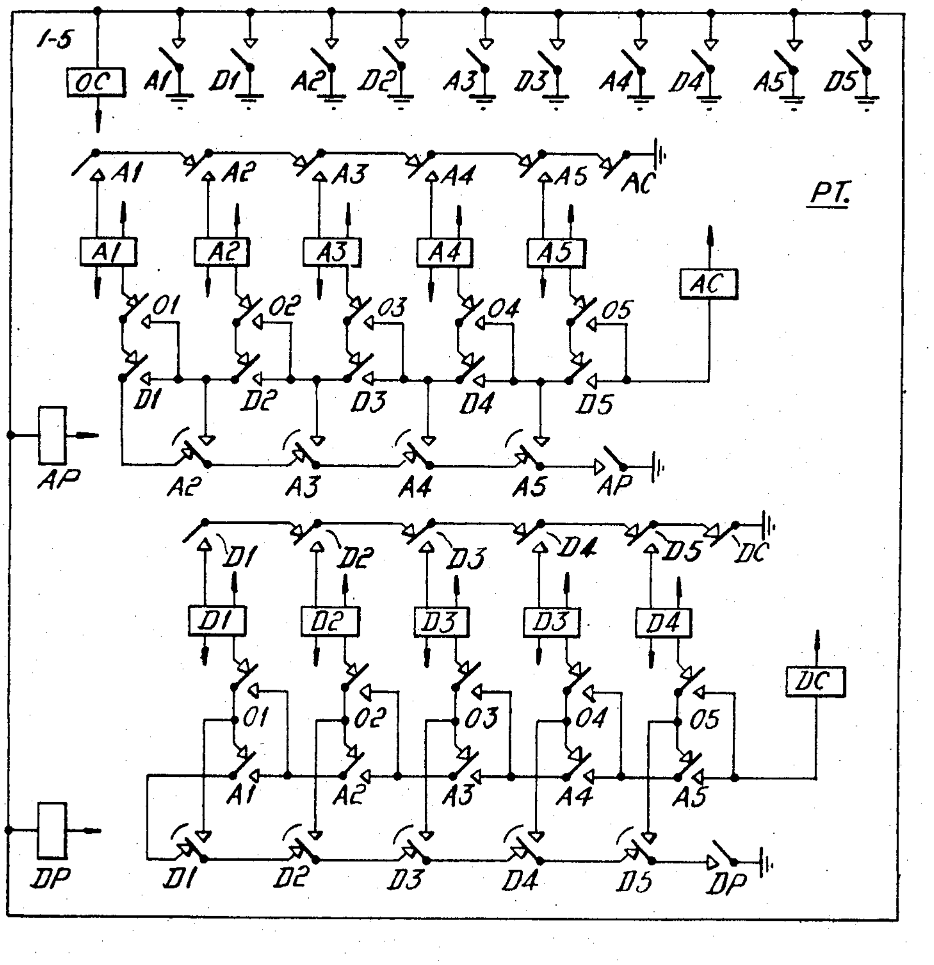
FIG. 3 shows, as an example, a pair of cyclic distribution systems for the two markers used in accordance with FIG. 2.

The following describes, as an example, the cyclic distribution circuits for "A" and "D" marking in distributor PT, illustrated in FIG. 3. This distributor comprises a busying relay OC for each channel (five in the example shown), a chain of relays A.1 to A5, plus a cycling relay AC for distributing the "A" marker, and a chain of relays D.1 to D.5, plus a cycling relay DC for distributing the "D" marker. Removal of a marker from a channel (following busying of the channel) and the transfer of this marker to another free channel is controlled each time by a relay, AP or DP, operated by the TA or TD device in the corresponding section, ART or DRT (FIG. 1), at a given instant in the program of a terminating or originating call.

The circuits shown are of a well known type and need not be described in detail. It should simply be noted that priority is given to the "D" marker (originating calls) over the "A" marker (terminating calls). The "A" relays cannot be operated if the channels are already busy or if they are marked "D"; if an "A" relay is operated, it can hold in only if the "D" relay of the same channel has not closed before the hold-in circuit is established. Similarly, the "D" relays cannot be operated if the channels are already busy or are marked "A"; however, if a "D" relay is energized, it will operate and hold in, even if the "A" relay of the same channel is energized at the same instant.

The practical examples described would enable a person versed in the art to apply to the present invention other diverse variants of communication systems, with or without a service channel, using a single- or two-marker system, etc. It should be understood, moreover that these practical examples do not in any manner limit the scope of the present invention.

I claim:

1. A mobile radiotelephone communication system enabling users of a public telephone network to communicate with users of two types of mobile units, namely, mobile radiotelephone units involving radiotelephone service and paging receiver units involving paging service, in which a telephone exchange is associated with a radiotelephone station operating over a plurality of channels and including an engagement device for these channels, the telephone exchange including registers for accepting terminating calls and recognizing those of the paging service, the system comprising: a first channel assigned for use with paging service calls and usable for radio telephone service, a memory device for storing numbers requested by the paging service while waiting for the channel assigned to these numbers to become free; means connecting the registers to this memory device in order to transfer to it the numbers requested by the paging service; and means for controlling the state of availability of the channel including a priority alternating device such that after a radiotelephone service communication the channel is first offered to the paging service before being freed, and after paging service transmission, the channel is first offered to the radiotelephone service before being freed.

2. A system as claimed in claim 1, in which the register includes means for determining the kind of call and releasing terminating call connections as soon as they are recognized to be calling paging service numbers.

3. A system as claimed in claim 1, in which the paging service numbers stored in the memory device are transmitted in limited groups.

4. A system as claimed in claim 1, in which the length of radiotelephone service communications over a channel used by the paging service is limited.

5. A system as claimed in claim 1, in which, means are provided in the engagement device for the channels to cause a terminating radiotelephone service call to wait (instead of refusing it) when there is no channel free for this service, and when a channel is busied in transmitting a limited group of paging service calls, to pass the waiting call after the limited group.

6. A system as claimed in claim 1, in which the paging service comprises several sections of paging receiver units, assigned respectively to several channels, and the memory device is provided with discriminating means for addressing the requested numbers to their assigned channels.

7. A system as claimed in claim 6, in which the memory device can deal with only one channel at a time, and the memory device includes a selection device which serves the channels one after the other.

8. A system as claimed in claim 1 for covering an extended area (or distance) by means of a plurality of differentiated stations operating on different groups of channels, in which the paging receiver units have built-in tuning to a given channel in any group; or they are built tuned to these channels.

9. A system as claimed in claim 8, in which the paging receiver units are shared among several channels in each different group.

10. A system as claimed in claim 8, in which a service channel is used for terminating radiotelephone service calls in all of the different stations.